United States Patent [19]

Byrne

[11] Patent Number: 4,883,680

[45] Date of Patent: Nov. 28, 1989

[54] PROCESS FOR PREPARING DRY ACETALDEHYDE AND PRODUCT PRODUCED THEREBY

[75] Inventor: Brian Byrne, North Brunswick, N.J.

[73] Assignee: International Flavors & Fragrances Inc., New York, N.Y.

[21] Appl. No.: 279,171

[22] Filed: Dec. 2, 1988

[51] Int. Cl.$^4$ .............................................. A23L 1/226
[52] U.S. Cl. .................................... 426/534; 426/384; 426/650
[58] Field of Search .................. 426/96, 384, 534, 650

[56] References Cited

U.S. PATENT DOCUMENTS

| | | | |
|---|---|---|---|
| 3,061,444 | 10/1962 | Rogers et al. | 99/140 |
| 3,140,184 | 7/1964 | Robbins | 99/28 |
| 3,395,021 | 7/1968 | Glicksman et al. | 99/78 |
| 3,554,368 | 1/1971 | Feldman | 426/650 |
| 3,554,768 | 1/1971 | Feldman | 99/140 |
| 3,736,149 | 5/1973 | Knapp | 99/78 |
| 4,280,011 | 7/1981 | De Simone | 568/603 |
| 4,296,137 | 10/1981 | Boden | 426/534 |
| 4,296,138 | 10/1981 | Boden | 426/534 |
| 4,330,417 | 5/1982 | Boden | 252/8.9 |
| 4,331,571 | 5/1982 | Boden | 252/522 |
| 4,333,481 | 6/1982 | Boden | 131/276 |
| 4,339,341 | 7/1982 | Boden | 252/50 |
| 4,341,646 | 7/1982 | Boden | 252/8.9 |
| 4,347,857 | 9/1982 | Boden | 131/276 |
| 4,348,416 | 9/1982 | Boden | 426/3 |
| 4,354,953 | 10/1982 | Boden | 252/174.11 |
| 4,357,315 | 11/1982 | Boden | 424/49 |
| 4,357,316 | 11/1982 | Boden | 424/49 |
| 4,386,063 | 5/1983 | Boden | 424/49 |
| 4,387,036 | 6/1983 | Boden | 252/174.11 |
| 4,405,510 | 9/1983 | Boden | 252/522 |
| 4,419,280 | 12/1983 | Boden | 252/522 |
| 4,421,125 | 12/1983 | Boden | 131/276 |
| 4,755,397 | 7/1988 | Eden et al. | 427/213.3 |

Primary Examiner—Donald E. Czaja
Assistant Examiner—Evan Federman
Attorney, Agent, or Firm—Arthur L. Liberman

[57] ABSTRACT

Described is a process for preparing dry acetaldehyde by means of freeze-drying a mixture of a modified food starch, water and acetaldehyde at a pH in the range of from about 7.2 up to about 7.5. The resulting product contains food grade acetaldeyde but does not contain any other by-products which are detrimental to the use of the material in foodstuffs, e.g., crotonaldehyde.

1 Claim, No Drawings

PROCESS FOR PREPARING DRY ACETALDEHYDE AND PRODUCT PRODUCED THEREBY

BACKGROUND OF THE INVENTION

Acetaldehyde is a flavor chemical which imparts the impression of freshness to flavors in which it is used, particularly fruit flavors. In order for acetaldehyde to be used in instantized foods, it must first be encapsulated in a dry form which releases the acetaldehyde under the conditions of use. For economic reasons, the amount of acetaldehyde fixed in the encapsulate must be as high as possible. Amongst the current methods of encapsulating acetaldehyde, spray-drying and freeze-drying are the most successful means of achieving a high fix level of acetaldehyde. Generally, fix levels above 2% are adequate, but 9 to 12% are preferable. The present methods for spray-drying acetaldehyde suffer from three disadvantages:

1. Acetaldehyde boils at 21° C. Spray-drying temperatures are usually in the range of 150°-200° C., consequently, large amounts of acetaldehyde are lost to evaporation during the spray-drying process. Losses can be as high as 90%.
2. Acetaldehyde has a flash point of −40° C.; therefore; normal spray-drying temperatures make this a potentially hazardous process.
3. Spray-drying acetaldehyde can give a product with varying amounts of two undesirable contaminants which arise from the reaction of acetaldehyde with itself. These contaminants are crotonaldehyde and paraldehyde.

Freeze-drying, on the other hand, is accomplished at temperatures well below 0° C.; consequently, losses of acetaldehyde due to evaporation are lower than for spray-drying. Because of the low process temperatures, freeze-drying acetaldehyde is a safer process than spray-drying. However, the present state-of-the-art freeze-drying produces varying amounts of the same two undesirable contaminants found in acetaldehyde which has been spray-dried (crotonaldehyde and paraldehyde). In the case of freeze-dried acetaldehyde, the level of paraldehyde is far greater than spray-dried material. This results from the chemistry of formation for the paraldehyde. At temperatures below 12° C., paraldehyde crystallizes out of solution. This drives the trimerization reaction of acetaldehyde to paraldehyde.

The present disclosure is for a process of freeze-drying acetaldehyde which obviates the disadvantages of existing state-of-the-art encapsulating methods.

THE INVENTION

Modified food starches and naturally occurring gums, such as gum arabic, have good oil encapsulating capacity; therefore, they are commonly used to encapsulate flavors by either spray-drying or freeze-drying. The modified food starches are prepared by a number of different methods. Some of the most successful flavor encapsulating modified food starches are prepared by reacting a portion of the hydroxyl groups with succinic or glutaric anhydride. Such treatment creates lipophilic areas on the starch allowing flavor oils to be enrobed by the starch prior to spray-drying or freeze-drying. Without the anhydride treatment, little oil retention (<1%) is observed upon encapsulation. contrast, modified food starches prepared with anhydrides can encapsulate 25% flavor oil with low surface oil.

There is one disadvantage to anhydride treated starches which is that the newly created lipophilic centers now contain terminal carboxyl groups. This becomes a disadvantage when acid reactive chemicals are present in the flavor oils. In the case of acetaldehyde, acids catalyze two undesirable reactions:

1. Acetaldehyde, under acid catalysis, polymerizes to paraldehyde as the major product.
2. Acetaldehyde undergoes an acid catalyzed Aldol condensation to form crotonaldehyde.

Either of the above by-products is undesirable from both a flavor and regulatory perspective. The presence of crotonaldehyde or paraldehyde at detectable levels creates an undesirable encapsulated acetaldehyde product. Similarly, naturally occurring gums used for encapsulation have low pH's and catalyze the same by-product formation.

The subject of this invention is that adjusting the pH of the modified food starch from 3-7 to above 7.0, and preferably to the range of 7.2 to 7.5 eliminates the presence of crotonaldehyde and paraldehyde while unexpectedly retaining the enrobing effect of the modified food starch. The acetaldehyde content of freeze-dried encapsulates prepared by this process routinely are around 9-12%.

Since modified food starches and food gums contain carboxylic acid groups, neutralization can be achieved by common bases such as $Na_2CO_3$, $NaHCO_3$, $KHCO_3$, $CaCO_3$, $Ca(OH)_2$, NaOH, KOH with sodium hydroxide being preferred. Because of the presence of the lipophilic areas adjacent to the carboxyl groups, the approach of aqueously borne bases is hindered. This results in longer neutralization times than one would expect. Other carboxylic acids, such as acetic acid are neutralized almost instantaneously with aqueous bases. Aqueous solutions or slurries of modified food starches are not adjusted to pH 7.5 merely by adding base. When a modified food starch is adjusted to pH 7.5 and stirring is maintained, the pH falls to below 7.0. To effectively neutralize several $NaHCO_3$, readjustments of pH are needed with continual stirring over an appropriate period of time. Using this process of repeated adjustments, pH of 7.5 can be achieved.

It is important that excess base is not added during the adjustment process since we have found that if pH 8.0 is exceeded, the modified food starch decomposes to its parent starch losing the ability to encapsulate the acetaldehyde. For this reason, a stepwise neutralization is mandatory. At pH 7.0 to 8.0, the modified food starches still maintain their encapsulation functionality and acid sensitive acetaldehyde is protected.

As the pH approaches 8.0, a second problem arises; that is the base catalyzed Aldol condensation to crotonaldehyde occurs. Consequently, pH's between 7.2 and 7.5 are optimal. At pH's below 7.0, both paraldehyde and crotonaldehyde form. At pH's greater than 7.5, crotonaldehyde forms. At pH's above 8.0, the functionality of the modified food starches is destroyed. By working in a narrow range of pH, the manufacture of a food grade encapsulated acetaldehyde is possible.

Because of the low pH's of modified food starches (pH 3-7) in water, prior to adjusting with base, acetaldehyde cannot be present. Furthermore, the addition of base causes localized high pH's which would favor crotonaldehyde formation if acetaldehyde were present during the pH adjustment.

It is beneficial that the modified food starches be dissolved in water rather than slurried. This facilitates the neutralization; although, this may not be economically practical due to the large amount of water to be removed. In such cases, the modified food starches can be suspended in an equal weight of water, then pH adjusted to 7.2–7.5, followed by acetaldehyde addition and freeze-drying. When the modified food starch is not fully solubilized, even greater attention must be paid to the stepwise neutralization. with solid modified food starches present, sufficient time and stirring are needed to neutralize the acid groups inside of the solids. Overshooting pH 7.5 is also more likely with solids present.

When the above methods are practiced, a freeze-dried product containing 9–14% acetaldehyde is obtained. Furthermore, the product has no detectable amounts of crotonaldehyde or paraldehyde.

Operable modified starches are as follows:
Maltrin-100;
MOREX ®;
LODEX ®;
Gum Acacia;
Gum Arabic;
Xanthan Gum; and
Guar Gum.

Mixtures of different modified food starches (as set forth supra) or combinations with sugars, other gums or polyalcohols (e.g., polyethylene glycol, e.g., PEG 100) or polypropylene glycol (e.g., PPG-450), Mannitol, Sorbitol and the like are also advantageous for encapsulation by the method of my invention.

Operable ranges of ingredients are as follows:
(a) the weight ratio of water:modified starch may vary from about 25:75 up to about 75:25; and
(b) the percent acetaldehyde in the mixture prior to freeze-drying may range from about 0.5% acetaldehyde up to about 25% acetaldehyde.

EXAMPLE I

The following mixture is prepared:

| Ingredients | Parts by Weight |
| --- | --- |
| Maltrin-100 | 454.5 g |
| Water | 454.5 g |
| Acetaldehyde (Anhydrous) | 91.0 g |

The mixture is prepared and treated as follows:

Maltrin-100, 454.5 g, is suspended in 454.5 g of water. With agitation, a 25% sodium hydroxide solution is added until a pH of 7.5 is reached. The pH is measured by an in-line pH-meter. Stirring is continued for an additional 30 minutes after which time the pH has dropped to 6.3. The pH is again adjusted to 7.5. After an additional 30 minutes of stirring, the pH is measured. If the pH is in the range of 7.2 to 7.5, no further adjustments are needed. If the pH is below 7.2, the previous pH adjustment step is repeated.

When pH adjustments are completed, the mixture is cooled to 15° C. before the acetaldehyde addition. The heat of acetadehyde hydration can raise the mixture temperature above the boiling point of acetaldehyde (bp 21° C.). The addition of acetaldehyde is done with cooling in order to maintain a temperature of less than 20° C.

The resultant mixture is cooled to freezing, broken up mechanically and freeze-dried to obtain an encapsulated product containing a 12% acetaldehyde fix. This product exhibits excellent ambient shelf-like characteristics.

EXAMPLE II

10 Parts by weight of the freeze-dried acetaldehyde prepared according to Example I, supra, is added to a reconstituted orange juice produced from concentrate (150 parts by weight). The "freeze-dried acetaldehyde" imparts a more natural like mouth feel and taste to the resultant product causing it to taste closer to "natural orange juice" than to "orange juice produced by means of reconstitution".

What is claimed is:
1. A process for preparing a dry form of acetadehyde comprising the steps, in sequence of:
(a) mixing a modified food starch with water thereby forming a mixture of water and modified food starch;
(b) adjusting the pH of the resulting mixture of modified food starch and water to a pH in the range of from about 7.2 up to about 7.5 thereby forming a pH-adjusted mixture of modified food starch and water;
(c) initimately admixing acetaldehyde with the pH-adjusted mixture of modified food starch and water; and
(d) freeze-drying the resulting mixture whereby the resulting freeze-dried product is free of paraldehyde and crotonaldehyde.

* * * * *